United States Patent [19]

Leo et al.

[11] 3,913,080

[45] Oct. 14, 1975

[54] MULTI-BIT CORE STORAGE

[75] Inventors: Donald C. Leo, Fountain Valley; Donnie G. Hurley, Northridge, both of Calif.

[73] Assignee: Electronic Memories & Magnetics Corporation, Los Angeles, Calif.

[22] Filed: Nov. 29, 1974

[21] Appl. No.: 528,278

Related U.S. Application Data

[63] Continuation of Ser. No. 351,259, April 16, 1973, abandoned.

[52] U.S. Cl....... 340/174 ZB; 340/174 QA; 29/604; 264/67

[51] Int. Cl.².................. G11C 11/061; B28B 11/00

[58] Field of Search............... 340/174 QA, 174 ZB; 29/604; 264/67

[56] References Cited

UNITED STATES PATENTS

| | | | |
|---|---|---|---|
| 3,315,087 | 4/1967 | Ingenito | 340/174 ZB |
| 3,480,926 | 11/1969 | Oberg | 340/174 QA |
| 3,538,600 | 11/1970 | Farrell et al. | 29/604 |
| 3,573,760 | 4/1971 | Chang et al. | 340/174 QA |
| 3,858,190 | 12/1974 | Friedman | 340/174 ZB |

*Primary Examiner*—James W. Moffitt
*Attorney, Agent, or Firm*—Lindenberg, Freilich, Wasserman, Rosen & Fernandez

[57] ABSTRACT

There is provided a magnetic ferrite memory core which is capable of multi-bit storage whereby the storage capacity of a memory comprising a given number of cores and having given physical dimensions is multiplied by the number of bits which can be stored in the core.

9 Claims, 12 Drawing Figures

MULTI-BIT CORE STORAGE

This is a continuation of application Ser. No. 351,259, filed Apr. 16, 1973 and now abandoned.

BACKGROUND OF THE INVENTION

This invention relates to magnetic core memories and, more particularly, to a memory providing multi-bit storage per core.

Presently available cores employed in magnetic core memories each stores only a bit of information at a time. In order to increase the storage capacity of a memory while maintaining its physical size reasonable, cores have been made smaller and smaller. However, because of the necessity of threading a plurality of wires through the center of the core, which is toroidal in shape, there are physical limitations which limit the smallest possible size for a memory system of any given number of bits. Also, since the individual cores in the memory must have several wires passed through the center, regardless of the size of each core, substantially the same labor and materials must be used to produce a memory of a certain capacity.

If more than one bit of information could be stored simultaneously in the same core, then the size of the memory for a given capacity could be sharply reduced, as well as the time and expense of the materials and labor required. Furthermore, if the number of bits stored in a core can be sufficiently large, then the core need not be reduced in size which would render a normally difficult stringing operation considerably less difficult.

With a core memory construction which uses multi-bit storage per core, a moderately large size memory can be made with a huge storage capacity such that it would rival disc or drum storage or other mass storage devices, but would have the advantage of permitting random access.

OBJECTS AND SUMMARY OF THE INVENTION

An object of this invention is to provide a magnetic core which has the capacity for storing a plurality of bits of information.

Another object of this invention is the provision of a unique and simple construction for a multi-bit storage core.

These and other objects of the invention may be achieved by forming a single core out of a plurality of different core materials, or more specifically, core materials which have the well known substantially rectangular hysteresis characteristics and different coercivity. This is achieved by making magnetic tapes or ribbons from the different core materials. These tapes are superimposed one on the other and then they are laminated by applying pressure in any suitable manner such as by rolling them between two large rollers with sufficient pressure to cause the tape material to adhere to one another. Single cores are then punched from the laminated tapes in a desired size, and they are thereafter fired in well known manner until they have been cured. There results a core having multi-bit storage capability.

The finished cores may thereafter be strung in rows and columns, the well known arrangements for magnetic core memories, to form for example a 2D or 2½D memory, using the well known techniques. However, for writing and reading, special drive programs must be employed.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
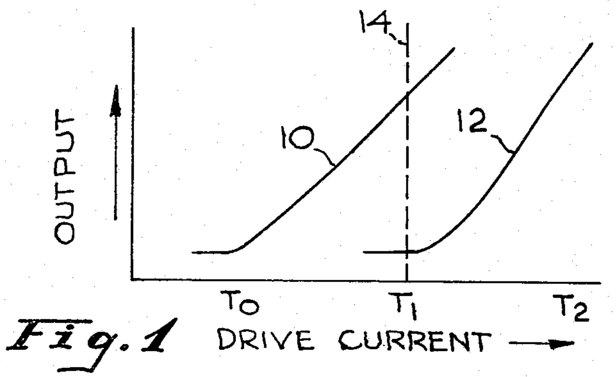
FIG. 1 is a drawing of two curves illustrating millivolt output versus current drive illustrating the requirements needed for materials used in an embodiment of this invention.

FIG. 1 represents by way of example, the curves of output in millivolts versus current drive required of two materials which can be employed in making a single core in accordance with this invention. It should be understood that the use of two materials is exemplary only. Those skilled in the art will, from this description, understand how to make a multi-bit storage core using more than two materials. Therefore, it is intended that the use of two materials in the description is exemplary only, and not to be construed as restrictive.

The respective curves 10, 12, are for two different materials, and constitute a plot of the output derived when the two materials are driven from saturation in one state toward saturation in the opposite state. It will be seen that for the material whose output curve is represented by the waveform 10, as the drive current increases, the material is driven from saturation in one state toward its other state, before the second material. Thus, the first material would have a lower coercivity than the second material. Both materials however have a substantially rectangular hysteresis characteristic. The use of the dotted line 14 is to indicate that at a particular current drive, there is a significant output derived from the material whose characteristics are represented by the curve 10 and, very little if any output derived from the material whose characteristics are represented by the curve 12.

Figure 2:
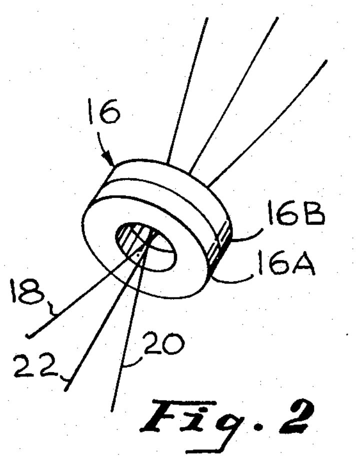
FIG. 2 is an isometric view illustrative of the appearance of an embodiment of this invention.

FIG. 2 represents a core 16, which is made of two different coercivity materials, respectively 16A, 16B, and threaded through the core are the windings, respectively 18, 20, which can serve as X and Y drive windings and a sense winding 22. This is illustrative for one type of winding arrangement which can be used for writing into and reading from the core. This is not to be construed as a limitation upon the invention, since those skilled in the art will appreciate that other arrangements may be used as well.

Figure 3A:
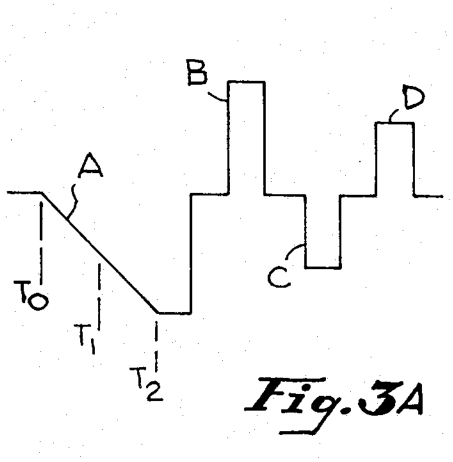
FIGS. 3A and 3B illustrates the waveforms of a program which may be used for reading from or writing into magnetic cores which are constructed in accordance with this invention.

FIG. 3A represents a waveform for one program of reading from and writing into the core shown in FIG. 2. The negative going pulse A, has a slow rise time starting at $T_0$, and extending through $T_1$ and $T_2$, when it attains a high drive level. Pulse A is a negative going pulse which is used for read-out. Pulse B is a positive going high drive, write pulse, (also known as a set pulse). Pulse C is a negative going low drive, reset pulse. Pulse D is a positive going low drive, write pulse. Instead of using a slow rising pulse for reading, a first and second pulse, respectively A' and A'' of low and high amplitude, may be generated at $T_1$ and $T_2$ times, as shown in FIG. 3B.

Figure 3B:
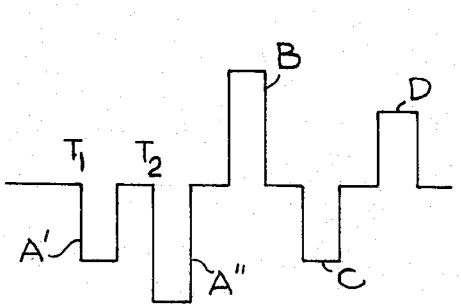

The programs shown in FIGS. 3A and 3B, each enables storage of four states, respectively (0,0)-(0,1)-(1,0)-(1,1)-. The first of the two digits represents the low drive output, the second of the two digits represents the high drive output.

FIGS. 4–7 are time versus output curves which represent the appearance of the read-out signal on the sensing line 22 obtained as a result of applying either the slow rise read pulse A, or the two pulses A' and A'' to the core. The drive applied to each of the A and B lines (which may be row and column lines), may be half the required reading drive shown in the program waveform of FIG. 3, so that coincidence current excitation is employed for core selection. As pointed out, this arrangement is exemplary, and for explanatory purposes only. Other arrangements using single line drive and inhibit windings for core selection, may be used, in well known manner.

Figure 4:
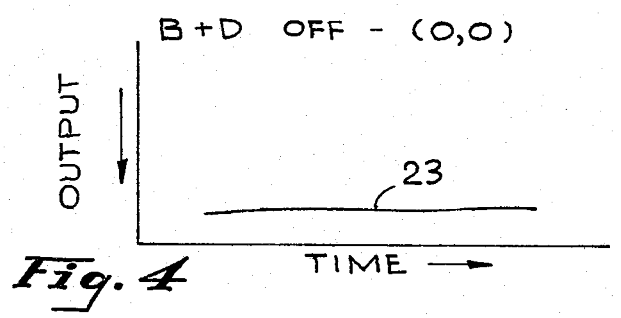
FIGS. 4, 5, 6 and 7 are curves representative of "output spread" from a core which has been built in accordance with this invention.
Figure 5:
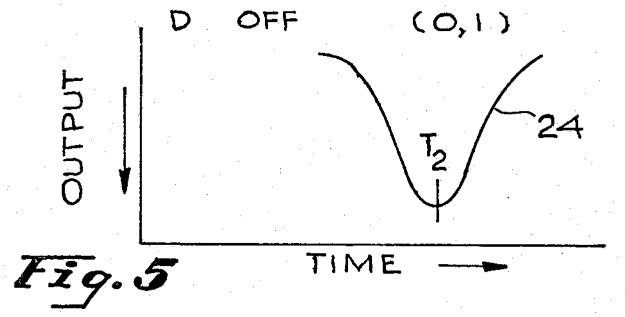

Assuming that the two materials of the core 16 are both saturated with a polarity of such that the negative going read pulse A, only drives them further into saturation, the cores are in their (0,0) state and therefore, the output on the sense winding is represented by the curve 23, which is shown in FIG. 4. It is essentially flat, representing the fact that there is no output derived.

The reading pulse places a core in its (0,0) state. To leave it in its 0 state, no write pulses are applied after a read pulse. In order to store a (0,1) in the core, where 0 is the least significant bit, and 1 is the most significant bit, then, the pulses B and C are applied, and the D pulse is suppressed, or not applied. The high drive write pulse B, drives both sections respectively, 16A and 16B into their 1 states, but the C pulse resets the low coercivity core material into its 0 state. Upon read-out, the curve of output versus time derived from the sense winding, will be the curve 24, shown in FIG. 5. There will be an output at $T_2$ time, representing core state (0,1) which is when the A read pulse has reached its maximum value.

Figure 6:
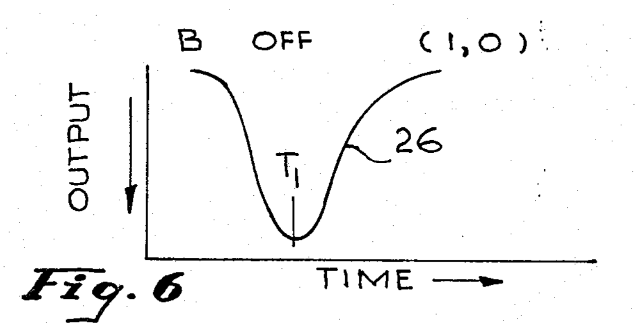

To place the core 16 in its (1,0) state, the B pulse is suppressed, or not applied, whereby first the C pulse occurs, which sets the low coercivity core into its 0 state, and then the D pulse occurs which sets the low coercivity core into its 1 state. Upon read-out, an output is derived from the low coercivity core at $T_1$ time as represented by the curve 26 in FIG. 6, representing core state (1,0).

To place the core 16 in its (1,1) representative state, the B pulse is applied and the C and D pulses may be suppressed. Typically however, if the C pulse is applied, then the D pulse must be applied also. A B pulse is large enough to place both the low coercivity material and the high coercivity material in their 1 representative states. If the C pulse is applied, then this drops the low coercivity material down to its 0 state, and the following D pulse returns the low coercivity material to its 1 state.

Figure 7:
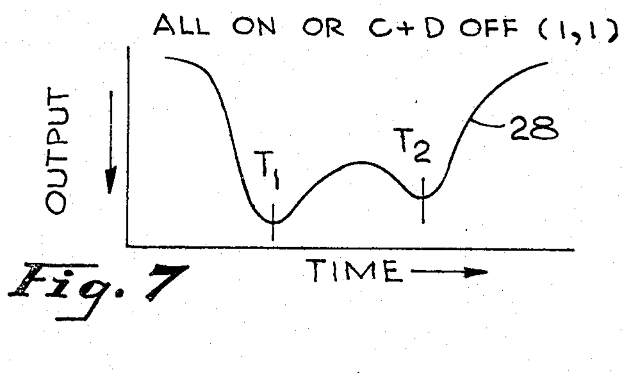

The curve 28 shown in FIG. 7 represents the waveform of the read-out on the sense winding 22. An output will be sensed at both $T_1$ and $T_2$ times indicative of the fact that the core has been storing the (1,1) states. It should be noted that the separation between $T_1$ and $T_2$ times is determined either by the rise time of the read pulse A, or by the separation between the leading edges of pulses A' and A''.

Figures 8, 9, 10:
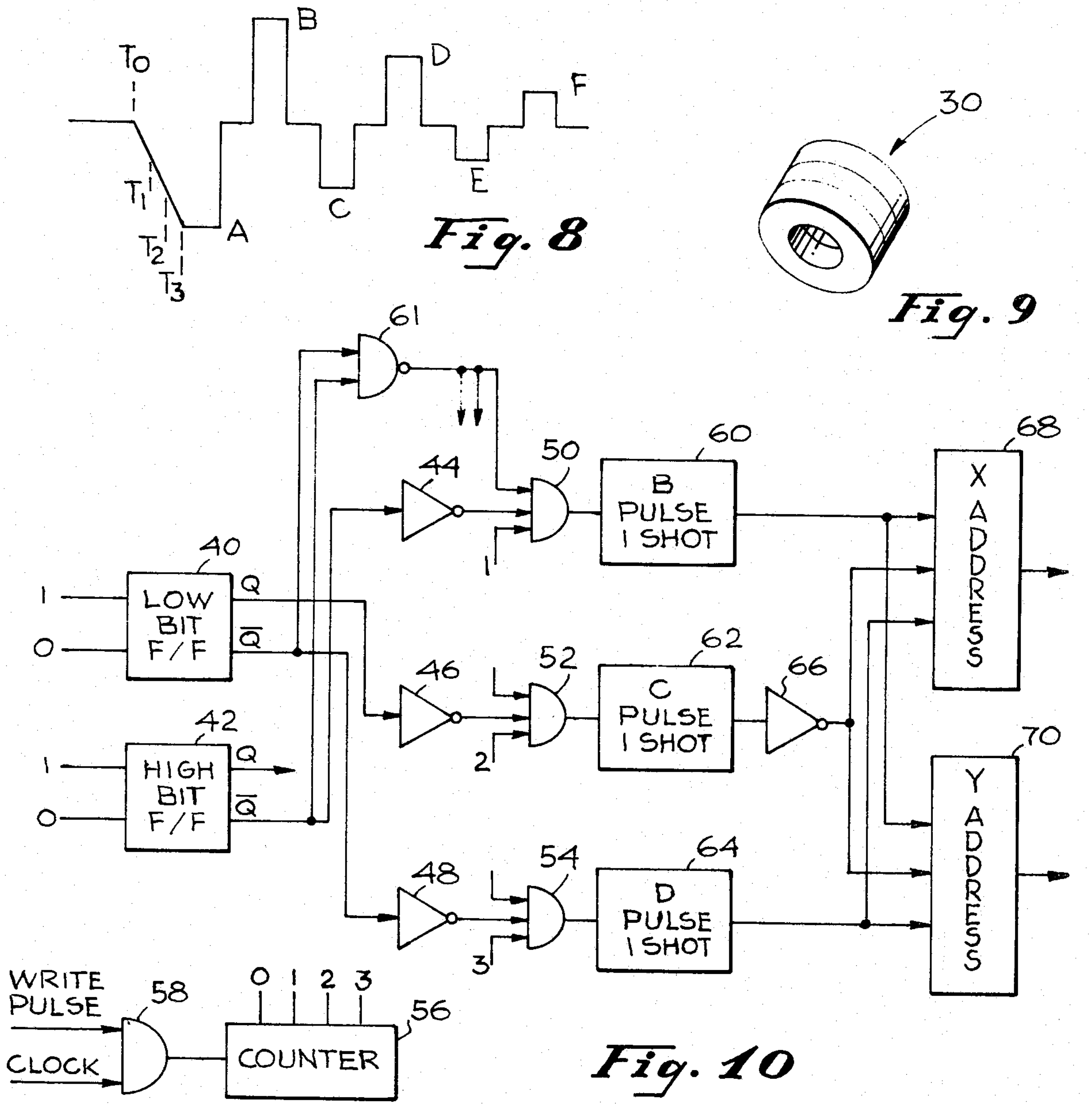
FIG. 8 represents a waveform of a program which can be used for reading and writing with a core having more than two storage layers.
FIG. 9 represents a storage core, in accordance with this invention having more than two storage layers.
FIG. 10 illustrates a schematic diagram of a system for writing into a core made in accordance with the teachings of this invention.

FIG. 8 is a drawing of a waveform illustrative of a pulse program which can be applied for driving a core having three different coercivity materials, such as is represented in FIG. 9 by the core 30. This core will represent eight different binary states, from 000 to 111. The program is similar to the one shown in FIG. 3A. Pulse A is a reading pulse which rises to a maximum over an interval extending from $T_0$ to $T_1$ to $T_2$ to $T_3$. Pulses B, C, D, E and F are pulses used in writing. Pulse B has sufficient drive to place the three materials in their 1 states. Pulse C drives the two lower coercivity materials to their 0 states. Pulse D has an amplitude sufficient to drive the two lower coercivity materials to their 1 states. Pulse E drives only the lower coercivity material to its 0 state, and pulse F drives the lower coercivity material back to its 1 state. It should be appreciated from the previous description how, by not applying any of the pulses B through F, a core is left in its 000 state, and by selectively applying the pulses B through F, a core can be placed in any of the states between 001 and 111. Also, if desired, three successively larger pulses may be used for read-out at $T_1$, $T_2$, and $T_3$ times, instead of the single slow rise pulse A. It should be appreciated from the foregoing that for storing $n$ binary bits, $n$ layers may be used for a core.

The generation of a slow rise read pulse or a plurality of successively larger amplitude pulses for read-out is capable of being readily electronically implemented by those skilled in the art. An integrating circuit or successively energized pulse generators can implement these. An illustration of a circuit for producing a writing program such as is illustrated in FIG. 3A or 3B is shown in FIG. 10.

The lowest order bit desired to be stored in a core is entered into a flip-flop 40, the highest order bit to be stored in the core is entered into the flip-flop 42. Thus, the respective Q and $\overline{Q}$ outputs of flip-flops 40 and 42 will represent the binary bits (0,0) to (1,1). The $\overline{Q}$ output of flip-flop 42, when high, drives an inverter 44. The Q output of flip-flop 40, when high, drives an inverter 48. The respective outputs of inverters 44, 46, and 48 are respectively applied as one input to the respective AND gates 50, 52 and 54. Another input to these AND gates are the respective 1, 2 and 3 outputs of a counter 56. A third input to these AND gates is the output of a NAND gate 61. This output is high except when it is desired to enter a (0,0) into a core. At that time, both $\overline{Q}$ outputs of the flip-flops 40 and 42 are high, signifying (0,0). These two outputs, which constitute the inputs to NAND gate 61 cause its output to go low, whereby AND gates 50, 52, 54 are all inhibited. If desired, an AND gate 58 may also be inhibited.

The counter 56 is driven through a complete cycle in response to clock pulses which are received through an AND gate 58. The AND gate is enabled by a write pulse. The respective AND gates 50, 52 and 54, when enabled, respectively drive a B pulse one shot circuit 64, a C pulse one shot circuit 62, and a D pulse one shot circuit 64. The outputs of these one shot circuits whose amplitudes are established at levels required for B, C and D pulses, are all applied to X and Y address circuits, respectively 68, 70, which, in well known fashion, drive the selected X and Y lines of a magnetic core memory comprised of columns and rows of cores, made in accordance with this invention.

In the absence of an input to the inverters 44, 46 and 48 upon the application of a write pulse to the AND gate 58, the counter would be driven through a cycle and a selected core would successively receive B, C and D pulses leaving it in a (1,1) storage state. If it is desired to leave a core storing (0,1), where 1 is the highest order digit, then it is necessary to prevent the application of a D pulse. If flip-flops 40 and 42 are set in the (1,0) state, the $\overline{Q}$ output of flip-flop 40 is high thereby enabling the inverter 48 to inhibit AND gate 54 so that upon the occurrence of the third count, the D pulse one shot circuit is not activated.

If it is desired to leave a core storing (0,1), where 1 is the lowest order digit, it is necessary to withold a B pulse. Thus, flip-flop 40 stores a 1 and flip-flop 42 stores a 0. Its $\overline{Q}$ output is high, whereby inverter 44 prevents AND gate 50 from enabling the B pulse one shot circuit.

If it is desired to store (1,1) in a core, a C pulse can be withheld if desired. AND gate 52 is inhibited by inverter 46 in response to the Q output of flip-flop 40, now storing a 1. Thus, the C pulse one shot circuit is not enabled.

A core is left in its (0,0) state after a read pulse, or A pulse has been applied. This is insured by the operation of NAND gate 60.

The method of making a core of materials having different coercivities includes first forming a tape or ribbon of each of the different core materials to be used before firing. The technology for doing this is well known. Each tape is made of a ferromagnetic tape material having substantially rectangular hysteresis characteristics, but with different coercivity. For example, using molar percents, one tape can be made of 17% $Li_2CO_3$ and 83% $Fe_2O_3$. This is quite a high coercivity material. The second tape may be made from 11% $Li_2CO_3$ + 6% ZnO + 3% NiO + 20% $MnO_2$ + 60% $Fe_2O_3$. This is a lower coercivity material. Another material from which a tape can be made consists of 10% $Li_2CO_3$ + 11% ZnO + 3% NiO + 19% $MnO_2$ + 57% $Fe_2O_3$. This produces a tape with a lower coercivity than the preceding formula. Other formulations from which ribbons can be made are well known in the art. Effectively, the tape making constitutes in mixing the ingredients, grinding them, and then taking the pre-calcined material, mixing it with an organic binder, and with plastisol solvents and forming aids. The material is then ground for several hours to achieve particle reduction and further mixing. The material is then rolled into thin tapes or ribbons and allowed to dry.

Figure 11:
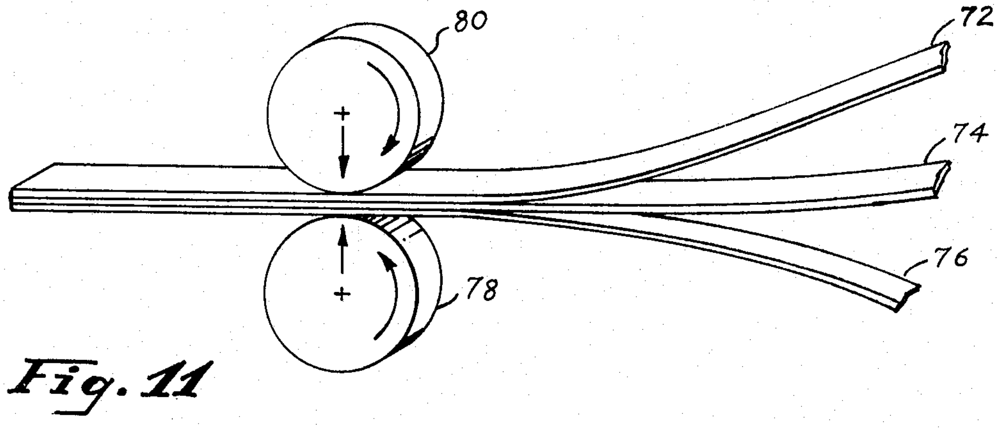
FIG. 11 illustrates a method of forming a multi-layer ferrite material tape under pressure.

In accordance with this invention, as represented in FIG. 11, two or more of these tapes 72, 74, and 76 are superimposed on one another and are then pressed together, as by passing them between two large rollers respectively, 80, 82, which provide therebetween sufficient pressure on the superimposed tapes to cause the materials of the tapes to adhere to one another and provide a laminated tape. The relative thickness of the respective tapes is normally not material to the operation of the system except that by varying the thickness of a particular tape, one can determine the amplitude of the output from that particular layer of ferrite material.

Thereafter, the laminated tapes are passed through suitable core punching equipment that punches toroidal cores having desired inner and outer diameters out of the superimposed tapes. Thereafter, the punched cores are fired in well known manner. It is necessary that the different layers of the laminate mature during the firing process at substantially the same time and temperature. Since the individual maturing time of the laminates during the firing process is known, all that is required is a careful selection of the materials being used to make up the laminate to assure this substantially close maturing time and temperature. The material whose compositions are given herein previously, have this property.

The foregoing is exemplary of one way of making a multi-bit storage core in accordance with this invention, and should not be considered as restrictive. Also, while the description of the invention illustrates two and three layer multi-bit cores, this should be as exemplary only, since more than three layers can be used, if desired.

There has accordingly been described and shown herein a novel core structure and manufacture whereby multi-bit storage is made feasible with a single magnetic storage core.

What is claimed is:

1. A multi-bit storage magnetic core comprising:

a unitary toroidal core made of a plurality of adherent contiguous layers of substantially rectangular hysteresis characteristic magnetic ferrite material, each layer having a coercive force which is different from the coercive force of all of the other layers, each layer having two states of magnetic remanence for representing two binary numbers, each layer at any given time having the property of being in one or the other of its two states of magnetic remanence independently of the state of magnetic remanence of any other layer whereby said core stores a plurality of separately identifiable binary numbers.

2. A multi-bit storage magnetic core as recited in claim 1, wherein each layer is made of a different ferrite magnetic material.

3. A single toroidal magnetic ferrite material storage core having substantially rectangular hysteresis characteristics and having a plurality of distinct contiguous digital storage layers, each layer having two states of magnetic remanence for storing independently of every other layer a separate binary number and having the property of being placed in one or the other of said storage states independently of the storage state of any other layers.

4. A single toroidal magnetic core formed of a plurality of contiguous layers of different ferrite magnetic materials each having a different coercive force from all of the others, each having a substantially rectangular hysteresis characteristic and two distinct states of magnetic remanence for representing two binary numbers, and means for leaving each layer in one or the other of its two states of magnetic remanence regardless of the state of magnetic remanence of any other layer, for storing a plurality of separately identifiable binary numbers.

5. The method of making a multi-bit storage core comprising:

forming a plurality of tapes of magnetic ferrite material, each magnetic ferrite material having a substantially square hysteresis characteristic and having a different coercive force, superimposing said different tapes of ferrite magnetic material upon one another, applying sufficient pressure to said different tapes of ferrite magnetic material to cause them to adhere to one another and to form a single multi-layer tape of different ferrite magnetic material, punching toroidal cores out of said multilayer tape of ferrite magnetic material, and firing said cores until the material of which they are composed has matured.

6. The method of making a multi-bit storage core as recited in claim 5 wherein the step of applying sufficient pressure to said different tapes of ferrite magnetic material includes passing said superimposed different tapes between two pressure rollers.

7. A multi-bit core storage system including a toroidal core made of a plurality of contiguous layers of substantially rectangular hysteresis characteristic ferrite material, each layer of material having a different coercive force, drive winding means passing through the aperture of said toroidal core for separately driving each layer into one or the other of two binary storage states, and read winding means passing through the aperture of said toroidal core for separately reading the binary storage state stored by each layer.

8. A multi-bit core storage system, as recited in claim 7, wherein said drive winding means for separately driving each layer into a desired binary storage state includes means for successively applying to a core, a coercive forces ranging from the maximum coercive force required to drive a layer of material from one to the other of its storage states to the minimum coercive force required to drive a layer from one to the other of its binary storage states.

9. A multi-bit core storage system, as recited in claim 7, wherein said read winding means for separately reading the binary storage state stored by each layer includes:

means for successively applying to a core coercive forces ranging from the minimum coercive force required to drive a layer of material from one to the other of its storage states to the maximum coercive force required to drive a layer from one to the other of its binary storage states.

* * * * *